(12) United States Patent
Denstedt et al.

(10) Patent No.: US 7,784,592 B1
(45) Date of Patent: Aug. 31, 2010

(54) STRADDLE BALANCE MILL CORRECTION

(75) Inventors: Todd Denstedt, Woodstock (CA); Mark C. Bennett, Brandtford (CA); Andrew Bradley, Milford, MI (US)

(73) Assignee: Kelsey-Hayes Company, Livonia, MI (US)

( * ) Notice: Subject to any disclaimer, the term of this patent is extended or adjusted under 35 U.S.C. 154(b) by 240 days.

(21) Appl. No.: 11/286,862

(22) Filed: Nov. 23, 2005

(51) Int. Cl.
*F16D 65/12* (2006.01)

(52) U.S. Cl. .............................. 188/218 XL; 188/18 A

(58) Field of Classification Search ............... 188/18 A, 188/218 XL, 264 R, 264 A, 264 AA; 73/468, 73/487; 409/138, 228, 229; 83/864, 875, 83/876
See application file for complete search history.

(56) References Cited

U.S. PATENT DOCUMENTS

| | | | | |
|---|---|---|---|---|
| 3,603,434 A * | 9/1971 | Leroux | | 188/218 XL |
| 4,488,074 A * | 12/1984 | Marandet | | 188/218 XL |
| 6,131,707 A * | 10/2000 | Buechel et al. | | 188/218 XL |
| 6,457,566 B1 * | 10/2002 | Toby | | 188/218 XL |
| 6,575,030 B1 * | 6/2003 | Lauf et al. | | 73/487 |
| 6,957,725 B2 | 10/2005 | Runels | | |
| 7,097,007 B2 * | 8/2006 | Lin | | 188/218 XL |
| 7,156,011 B2 * | 1/2007 | Morris et al. | | 83/876 |
| 2006/0076200 A1 * | 4/2006 | Dessouki et al. | | 188/218 XL |
| 2006/0230888 A1 * | 10/2006 | Sammartin | | 82/1.11 |

FOREIGN PATENT DOCUMENTS

DE  40 18 961  12/1991

* cited by examiner

*Primary Examiner*—Thomas J Williams
(74) *Attorney, Agent, or Firm*—MacMillan, Sobanski & Todd, LLC

(57) ABSTRACT

A method is provided for balancing a disc brake rotor having a first annular friction plate, a second annular friction plate, and a core gap. The first annular friction plate includes a first circumferential surface. The second annular friction plate includes a second circumferential surface. Respective regions are determined for removing material within the first circumferential surface and the second circumferential surface for balancing the disc brake rotor if the disc brake rotor is out of balance. A rotary straddle cutting tool is aligned with respective regions of the first circumferential surface and the second circumferential surface. Material is cut from the respective regions of the first circumferential surface and the second circumferential surface with the rotary straddle cutting tool. Cutting material from the respective regions includes removing material within the width of the first circumferential surface and the second circumferential surface.

12 Claims, 3 Drawing Sheets

US 7,784,592 B1

STRADDLE BALANCE MILL CORRECTION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to vehicle brake rotors and in particular to a brake rotor adapted for use in a vehicle brake assembly and to a method for balancing such a brake rotor.

2. Description of the Related Art

Vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. A caliper assembly is slidably supported by pins secured to an anchor bracket. The anchor bracket is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

A typical disc brake rotor is formed from grey cast iron during a sand mold casting process. The rotor includes a generally hat-shaped body, and an outer annular section which are integrally cast as one-piece during the casting process. This kind of rotor is commonly referred to as a "full cast" rotor. In some instances, the rotor is formed with an integrally cast hub, and is referred to as a "uni-cast" rotor.

In the above rotor constructions, the hat-shaped body includes a mounting surface having a centrally located cast-in pilot hole formed therein during the casting process that is machined to size, and a plurality of lug bolt receiving apertures equally spaced circumferentially about the pilot hole. The lug bolt receiving apertures are formed during a subsequent drilling operation.

The outer annular section of the rotor includes two parallel outer surfaces which define a pair of brake friction surfaces. The brake friction surfaces can be cast as a single solid brake friction plate, or can be cast as a pair of brake friction plates disposed in a mutually spaced apart relationship by a plurality of ribs or vanes to produce a "vented" rotor. The brake friction surfaces, as well as other selected surfaces of the rotor including the lug bolt receiving apertures, are typically machined by two "rough" finishing operations followed by a single "finish" machining operation.

High speed rotating components such as rotors spin at high speeds. Any imbalances in the rotor while spinning at high speeds may result in vibration, noise, or premature bearing wear which leads to decreased performance and NVH degradation. Typically the rotors require balancing by the removal of material from the outer diameter of the rotor. The material removed from the outer diameter of the rotor typically includes material from both rotor discs and may also include material from the interconnecting ribs or vanes (i.e., core gap) therebetween. To determine the amount of material to be removed from the rotor, the rotor is rotated at a predetermined speed and is weighed while rotating. An out of balance condition is determined, in addition to the amount of material to be removed. The location and the depth of the material to be removed is also calculated. The rotor is then milled at the desired location for correcting the balance of the rotor.

The material removed by the milling operation is typically removed by a cutter wheel. The cutter wheel is a rotary cutting tool that includes a plurality of cutting blades each spaced circumferentially from one another and extending radially outward above the circumference of the cutter wheel. The location of the material to be removed along the outer circumference of the rotor is brought into contact with rotating cutter wheel. The predetermined amount of material (i.e., calculated length and depth of cut) at the determined location is then removed from the circumference of the rotor.

A disadvantage with removing material from the outer circumference of the rotor is that core gap of the rotor is not a solid surface. Rather the core gap includes vanes or ribs extending between the rotor discs (as described earlier). Typically the vanes in the core gap are not uniform to one another due to inherent inefficiencies in the casting process for the rotors as a result of core wash that is caused by molten material flowing by the core surface. The core wash causes the core opening of the rotor to be larger when measured at the ingate due to the molten cast material (e.g., iron) flowing through the core at the ingate (i.e., a bottom portion of the casting) than at the riser (i.e., top portion of the casting). The calculations made for the amount of material to be removed are based on both discs and the core gap having a uniform structure. But due to the variations in the core gap, inaccurate amounts of material may be removed which may result in an unbalanced rotor which may require additional milling correction operations before the rotor is within the balanced specification.

BRIEF SUMMARY OF THE INVENTION

The present invention has the advantage of removing material from only respective regions of a circumference of each annular friction plate with a straddle cutting tool so that predetermined amount of material mass at a calculated sweep angle and cutting depth are removed from each annular friction by the straddle cutting tool.

In one aspect of the invention, a method is provided for balancing a disc brake rotor having a first annular friction plate, a second annular friction plate, and a core gap with vanes connecting the first annular friction plate and the second annular friction plate. The first annular friction plate includes a first circumferential surface. The second annular friction plate includes a second circumferential surface. A determination is made whether the disc brake rotor is out of balance. Respective regions are determined for removal of material within the first circumferential surface and the second circumferential surface for balancing the disc brake rotor if the disc brake rotor is out of balance. A rotary straddle cutting tool is aligned with respective regions of the first circumferential surface and the second circumferential surface. Material is cut from the respective regions of the first circumferential surface and the second circumferential surface with the rotary straddle cutting tool. Cutting material from the respective regions include removing material within the width of the first circumferential surface and removing material within the width of the second circumferential surface.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
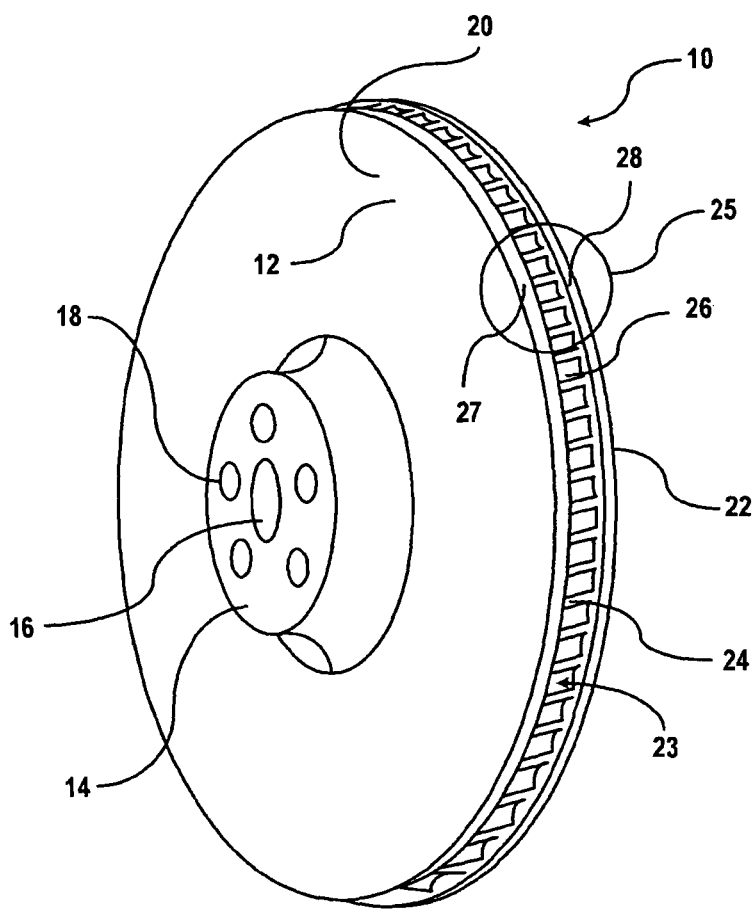
FIG. 1 is a perspective view of a prior art brake disc rotor

Referring now to the drawings, there is illustrated in FIG. 1, a perspective view, of a disc brake rotor, shown generally at 10. The rotor 10 is utilized in a disc brake assembly (not shown). The rotor 10 is formed from a one-piece casting, such as iron. Alternatively, the rotor 10 may be cast from other metals or alloys such as steel or aluminum.

The rotor 10 includes a friction disc 12 and a mounting flange 14. The friction disc 12 and the mounting flange 14 are integrally formed as a single piece during the casting operation.

The mounting flange 14 includes a centrally located hole 16 and a plurality of receiving holes 18. Lug bolts (not shown) and a vehicle axle shaft (not shown) are received by the plurality of receiving holes 18 and the centrally located hole 16, respectively, for securing a wheel (not shown) and rotor 10 to the vehicle axle shaft.

The friction disc 12 includes a first annular friction plate 20 and a second annular friction plate 22. The first annular friction plate 20 and the second annular friction plate 22 are in spaced relation to one another. A core gap 23 is disposed between the first annular friction plate 20 and the second annular friction plate 22. A plurality of vanes 24 (or ribs) is laterally disposed within the core gap 23. The plurality of vanes 24 are equally spaced circumferentially around the friction disc 12 and extend radially inward from just beneath the outer circumference of the friction disc 12. The plurality of vanes 24 is integrally formed during the casting operation of the rotor 10. Disposed between each successive pair of vanes is an air gap 26 that extends radially inward from the outer circumference of the friction disc 12. Each air gap 26 provides a cooling passageway between the first annular friction plate 20 and the second annular friction plate 22. Heat is dissipated from the core gap 23 when friction brake pads (not shown) are applied to the first annular friction plate 20 and the second annular friction plate 22.

Figure 2:
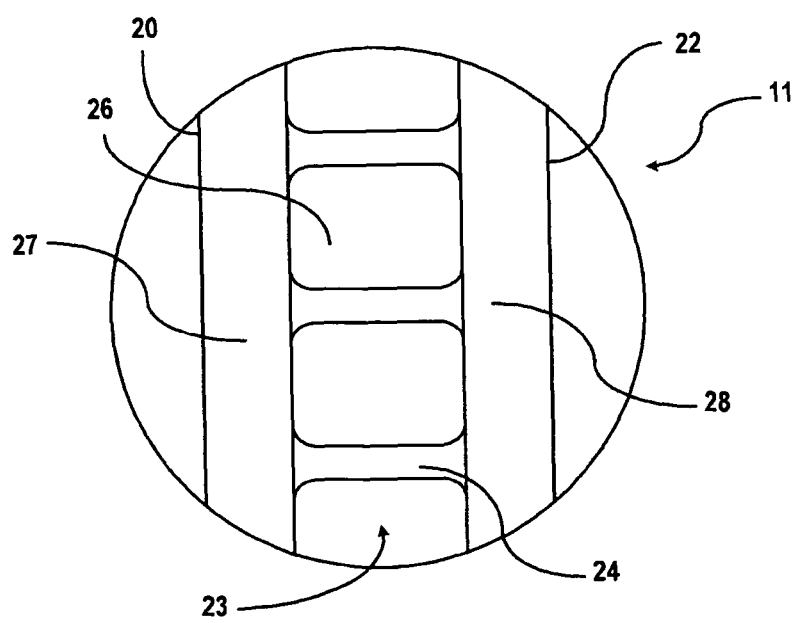
FIG. 2 is an enlarged section of the encircled portion as shown in FIG. 1.

The outer circumference of the first annular friction plate 20 and second annular friction plate 22 include a first circumferential surface 27 and a second circumferential surface 28, respectively. The encircled portion 25 is shown in greater detail in FIG. 2. The first circumferential surface 27 and the second circumferential surface 28 are uniform solid surfaces. The plurality of vanes 24 laterally connecting the first annular friction plate 20 and second annular friction plate 22 are disposed radially below the first and second circumferential surfaces 27 and 28. In general, each of the plurality of vanes 24 are non-uniform at their outermost edge in terms of thickness and surface variation. The non-uniform edges are the result of core wash which causes each of the air gap 26 openings to be larger at the ingate (not shown) than at the riser (not shown) as discussed earlier.

Figure 3:
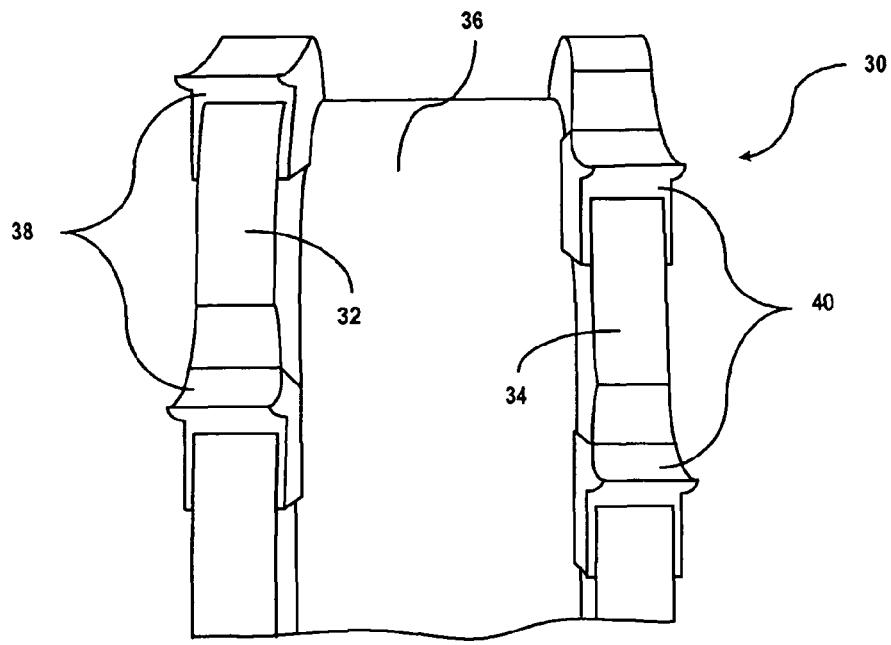
FIG. 3 is an elevation view of a portion of a cutting tool according to a preferred embodiment of the present invention.
Figure 4:
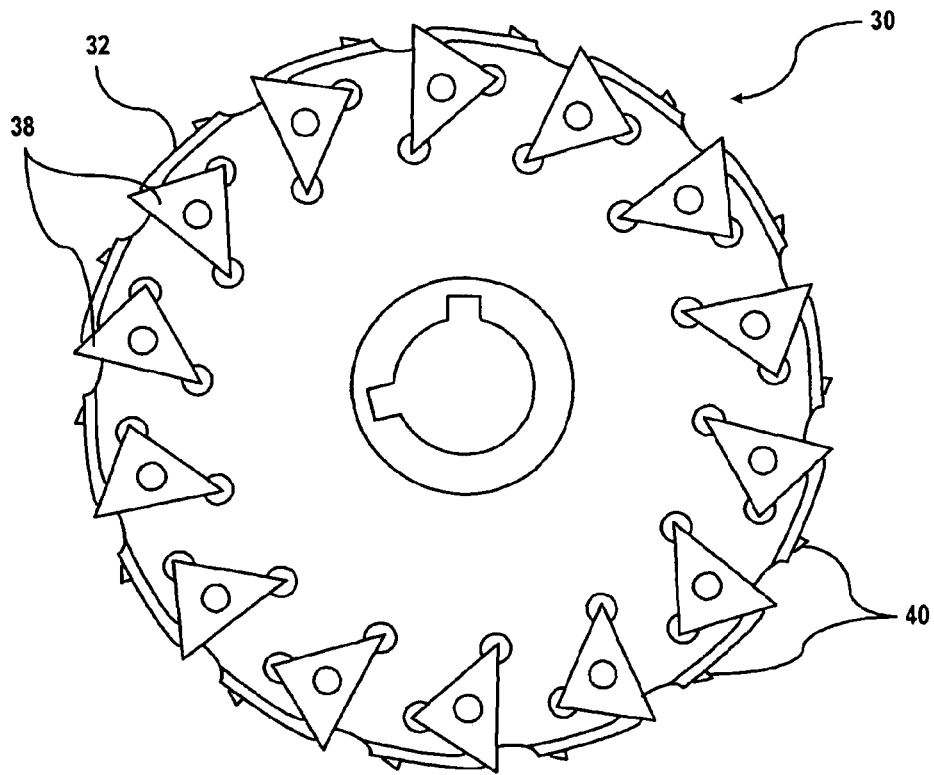
FIG. 4 is a side view of the cutting tool according to the preferred embodiment of the present invention.

Referring now to FIG. 3 and FIG. 4, there is shown a cutting tool 30 according to a preferred embodiment of the present invention. The cutting tool 30 is preferably a rotary milling tool that includes a first annular cutting edge 32 and a second annular cutting edge 34. The first annular cutting edge 32 and the second annular cutting edge 34 are spaced apart a predetermined distance. A center portion 36 extends between the first annular cutting edge 32 and the second annular cutting edge 34 so that a straddle cut may be performed on a milled rotor.

The first annular cutting edge 32 includes a first plurality of cutters 38 circumferentially disposed and equally spaced about the circumference of the first annular cutting edge 32. Each of the first plurality of cutters 38 extend radially above the surface of the first annular cutting edge 32 for performing a milling operation.

The second annular cutting edge 34 includes a second plurality of cutters 40 circumferentially disposed and equally spaced about the circumference of the second annularly cutting edge 34. Each of the second plurality of cutters 40 extend radially above the surface of the second annular cutting edge 32 for performing a milling operation.

The center portion 36 is recessed below the surfaces of the first annular cutting edge 32 and the second annular cutting edge 34. The recessed center portion 36 allows the milling cutting tool to make the straddle cut. The rotor being milled will have material removed for only those portions that come into contact with the cutters of the first annular cutting edge 32 and second annular cutting edge 34. The portion of the rotor opposite the center portion 36 remains uncut.

Figure 5:
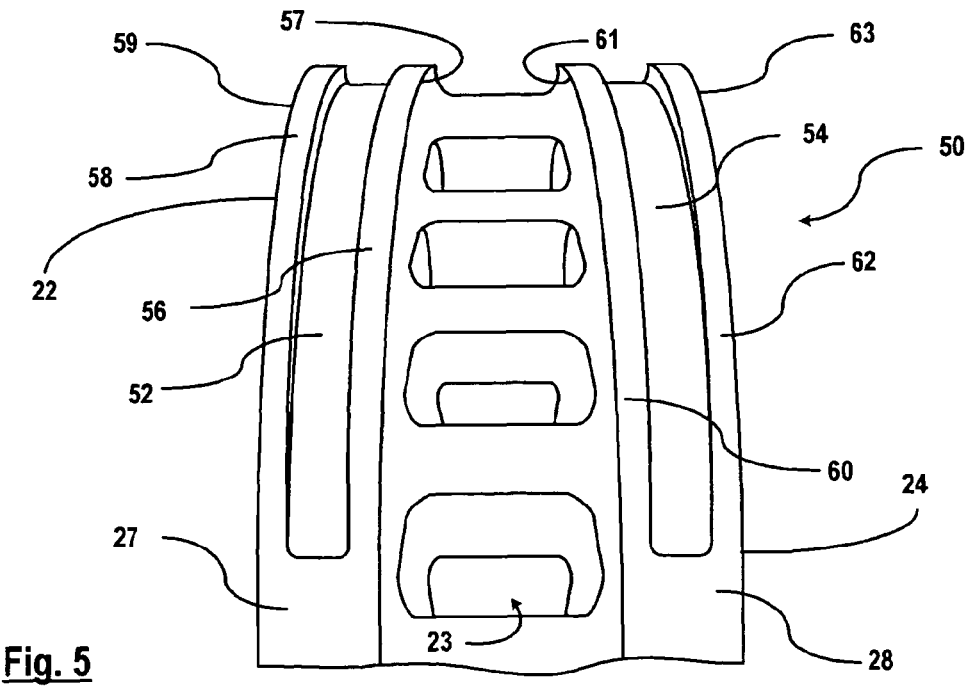
FIG. 5 is an elevation view of a portion of the disc brake rotor according to the preferred embodiment of the present invention.

Referring to FIG. 5 there is shown a section of a milled rotor 50 according to the preferred embodiment of the present invention. Material is removed only from the first circumferential surface 27 and the second circumferential surface 28. As illustrated in FIG. 5, a first milled section 52 is cut from an annular region of the first circumferential surface 27. Both a sweep angle (annular) and a cutting depth are calculated prior to the milling operation. The milled section 52 includes the annular region within the first circumferential surface 27 within the calculated sweep angle. Preferably, a circumferential edge surface portion 56 which is juxtaposed to the first milled section 52 remains uncut. Maintaining at least a first distance from circumferential edge 57 adjacent the core gap 23 assures that material is not removed from areas where surface variations may exist which could result in inaccurate material removal. In addition, a circumferential edge surface portion 58 which is juxtaposed to the first milled section 52 remains uncut. Maintaining at least a second distance from a circumferential edge 59 of the first annular friction plate 22 assures that material is not removed from areas where surface variations may exist. Preferably, the distance of the widths of the circumferential edge surface portion 56 (i.e., first distance from circumferential edge 57 to first milled section 52) and the circumferential edge surface portion 58 (i.e., second distance from circumferential edge 59 to said first milled section 52) are equal. Alternatively, each width (distances) may be unequal to one another.

Also illustrated in FIG. 5, a second milled section 54 is cut from an annular region of the second circumferential surface 28. Both a sweep angle (annular) and a cutting depth are calculated prior to the milling operation. The milled section 54 includes the annular region within the second circumferential surface 28 within the calculated sweep angle. Preferably, a circumferential edge surface portion 60 which is juxtaposed to the second milled section 54 remains uncut. Maintaining at least a first distance from a circumferential edge 61 adjacent the core gap 23 assures that material is not removed from areas where surface variations may exist which could result in inaccurate material removal. In addition, a circumferential edge surface portion 62 which is juxtaposed to the second milled section 54 may remains uncut. Maintaining at least a second distance from a circumferential edge 63 of the second annular friction plate 24 assures that material is not removed from areas where surface variations may exist. Preferably, the distance of the widths of the circumferential edge surface portion 60 (i.e., first distance from the circumferential edge 61 to the second milled section 54) and the circumferential edge surface portion 62 (i.e., second distance from the circumferential edge 63 to the second milled section 54) are equal. Alternatively, each width (distances) may be unequal to one another.

The removal of material of the both first milled section 52 and the second milled section 54 are performed in a same milling operation by the cutting tool 30. Preferably, the first milled section 52 and second milled section 54 are cut at substantially a same length and depth. The sweep angle and cutting depth are determined from an algorithm. The sweep angle may be determined in response to a predetermined cutting depth. For example, the cutting depth may be set to a predetermined cutting depth such as the maximum allowable cutting depth of the cutting tool. Based on the cutting depth the tool is set to, the respective sweep angle is determined for the predetermined cutting depth for removing the material mass. Alternatively, the cutting depth may be determined in response to a predetermined sweep angle. For example, a determination may be made to utilize a predetermined sweep angle. Based on the predetermined sweep angle, the respective cutting depth is determine for cutting a respective amount of material mass for balancing the rotor 10. In yet another embodiment, the algorithm may calculate the cutting depth and sweep angle concurrently.

Figure 6:
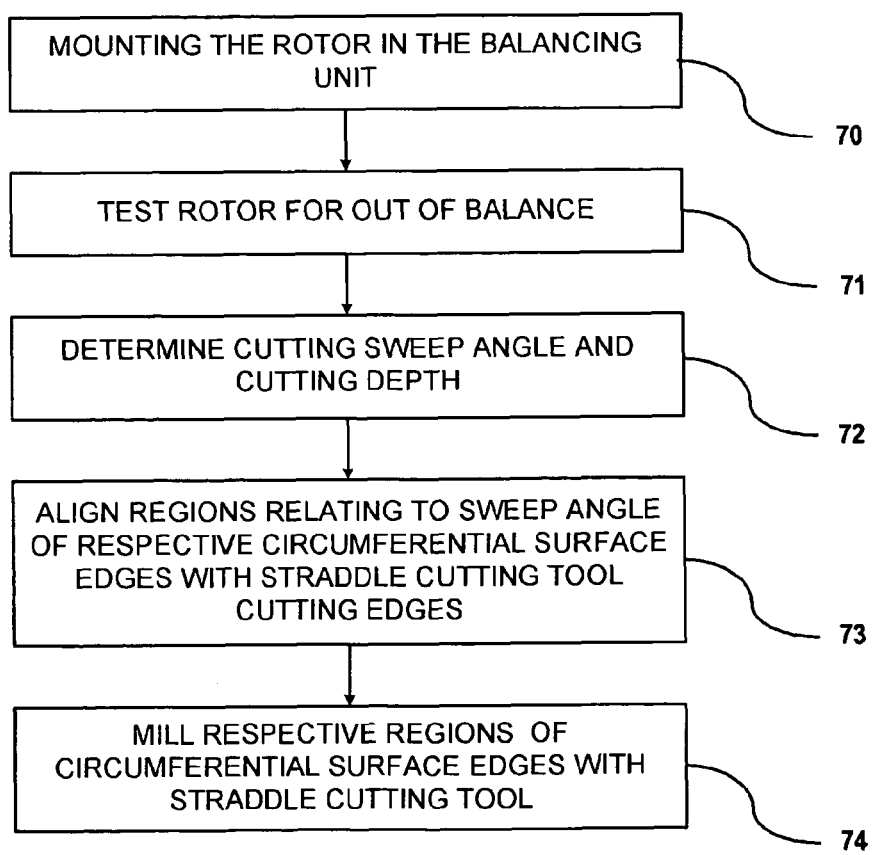
FIG. 6 is a flow chart of a method for a straddle mill cutting operation according to a preferred embodiment of the present invention.

FIG. 6 illustrates a method for creating a straddle cut on a disc brake rotor or similar component. In step 70, a brake disc rotor is mounted in a balancing unit, which is known to those skilled in the art and will not be shown herein. In step 71, the rotor is rotated and an out of balance condition is determined. The determination of the out of balance condition is also known to those skilled in the art.

In step 72, a sweep angle correlating an annular starting location and an annular termination location of the circumferential edges is determined, in addition to calculating the cutting depth of each milled section for removal of material for balancing the rotor.

In step 73, the respective cutting edges of the milling tool are aligned with the respective circumferential edge surfaces of the rotor.

In step 73, the rotating straddle milling tool is brought into contact with the rotor along the regions in the calculated sweep angle. The material along the region of the calculated sweep angle is cut at the calculated depth from each circumferential edge surface of the rotor.

The material removed for balancing the rotor is cut only from the uniform regions of the rotor while the areas having manufacturing variations such as in the core gap remains uncut. Removing material in only the uniform regions of the rotor reduces the likelihood of having to re-cut the rotor due to imbalances caused from the removal of material in those regions where variations exist.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for balancing a disc brake rotor having a first annular friction plate, a second annular friction plate, and a core gap with vanes connecting said first annular friction plate and said second annular friction plate, said first annular friction plate including a first circumferential surface having respective first and second circumferential edges, and said second annular friction plate including a second circumferential surface having respective first and second circumferential edges, said method comprising the steps of:
    determining whether said disc brake rotor is out of balance;
    determining respective regions for removal of material within said first circumferential surface and said second circumferential surface for balancing said disc brake rotor if said disc brake rotor is out of balance;
    aligning a rotary straddle milling cutting tool with said respective regions of said first circumferential surface and said second circumferential surface, the rotary straddle cutting tool having a first cutting edge and a second cutting edge spaced apart from one another by a recessed center portion disposed between the first cutting edge and the second cutting edge for allowing the milling cutting tool to make a straddle cut; and
    operating said rotary straddle milling cutting tool to simultaneously cut material only from said respective regions of said first circumferential surface and said second circumferential surface with said rotary straddle cutting tool;
    wherein the cutting of material from said respective regions includes removing material in a circumferential direction within a width of said first circumferential surface without removing material from the first and second circumferential edges of the first circumferential surface, and removing material within a width of said second circumferential surface without removing material from the first and second circumferential edges of the second circumferential surface.

2. The method of claim 1 wherein said step of determining respective regions includes determining a mass of material to be removed from said first circumferential surface and said second circumferential surface.

3. The method of claim 1 wherein said step of determining respective regions includes calculating a sweep angle and a cutting depth for removal of material for said first circumferential surface and said second circumferential surface.

4. The method of claim 3 wherein said sweep angle is determined in response to a predetermined cutting depth.

5. The method of claim 4 wherein said predetermined cutting depth is a maximum allowable cutting depth of said cutting tool.

6. The method of claim 3 wherein said sweep angle and said cutting depth are calculated concurrently.

7. The method of claim 1 wherein removing material within the width of said first circumferential surface includes removing material from at least a first distance from a first circumferential edge of said first circumferential surface and at least a second distance from a second circumferential edge of said first circumferential surface.

8. The method of claim 7 wherein said first distance and said second distance are equal.

9. The method of claim 7 wherein said first distance and said second distance are unequal.

10. The method of claim 1 wherein removing material within the width of said second circumferential surface includes removing material from at least a first distance from a first circumferential edge of said second circumferential surface and at least a second distance from a second circumferential edge of said second circumferential surface.

11. The method of claim 9 wherein said first distance and said second distance are equal.

12. The method of claim 9 wherein said first distance and said second distance are unequal.

* * * * *